US009227336B2

(12) United States Patent
Hebbeln

(10) Patent No.: US 9,227,336 B2
(45) Date of Patent: Jan. 5, 2016

(54) ACCELERATION TUBE FOR HYDRAULIC CUTTING SYSTEM

(71) Applicant: Vanmark Equipment, LLC, Creston, IA (US)

(72) Inventor: Christopher Paul Hebbeln, Boise, ID (US)

(73) Assignee: VANMARK EQUIPMENT, LLC, Creston, IA (US)

(*) Notice: Subject to any disclaimer, the term of this patent is extended or adjusted under 35 U.S.C. 154(b) by 157 days.

(21) Appl. No.: 14/147,657

(22) Filed: Jan. 6, 2014

(65) Prior Publication Data

US 2015/0190940 A1 Jul. 9, 2015

(51) Int. Cl.
*B65G 51/18* (2006.01)
*B26D 7/06* (2006.01)
*B26D 1/02* (2006.01)

(52) U.S. Cl.
CPC ................ *B26D 7/0658* (2013.01); *B26D 1/02* (2013.01)

(58) Field of Classification Search
USPC ........ 406/93, 195, 196; 138/113, 114; 83/402
See application file for complete search history.

(56) References Cited

U.S. PATENT DOCUMENTS 1,737,161 A * 11/1929 Jupp ...................... B60K 15/00 137/212
2,733,105 A * 1/1956 Williams .................. F04F 5/46 406/194
3,097,752 A 7/1963 Thumim
3,565,345 A * 2/1971 Herbert ................. C01B 33/183 239/132.3
4,082,024 A * 4/1978 Hodges ................. A23L 1/2163 83/164
4,614,141 A 9/1986 Mendenhall
RE32,822 E * 1/1989 Hodges ................ B26D 31/185 83/164
5,179,881 A * 1/1993 Frey ......................... B26D 3/11 83/149
5,390,590 A * 2/1995 Mendenhall ............. A23N 4/22 83/402
5,394,793 A 3/1995 Julian et al.
5,568,755 A 10/1996 Mendenhall
5,806,397 A 9/1998 Mendenhall
5,966,768 A * 10/1999 Hahn ........................ F28G 1/08 15/104.061
7,052,213 B2 5/2006 Mendenhall
2004/0231742 A1* 11/2004 Beaumont ............ E04G 15/061 138/113

FOREIGN PATENT DOCUMENTS

GB 1012608 12/1965

* cited by examiner

*Primary Examiner* — Joseph Dillon, Jr.
(74) *Attorney, Agent, or Firm* — Jason H. Foster; Kremblas & Foster

(57) ABSTRACT

An acceleration tube for use in a hydro-cutting system. A flexible, tapered tube is mounted in a rigid cylindrical housing. Flanges formed at opposite ends of the flexible tube mount adjacent ends of the rigid housing, forming an annular chamber radially between the tube and the housing, and longitudinally between the flanges. A centralizing ring maintains the outlet end of the tube aligned coaxially with the cutting assembly of the hydro-cutting system, but is difficult to bypass during insertion of the tube into the housing. A fluid valve is used to inject fluid into the chamber to force the outlet end flange past the centralizing ring during installation of the tube in the housing.

3 Claims, 5 Drawing Sheets

42
52'

20
22
24
26
34
36
C
C 24
34
36
42
50
51
52
54
60
62
70
72
22
y
FLOW

CUTTER HEAD INSERTS INTO SQUARE POCKET TO INSURE ALIGNMENT
36
OUTLET END 36
20

34
34'
34
INLET END

ACCELERATION TUBE FOR HYDRAULIC CUTTING SYSTEM

BACKGROUND OF THE INVENTION

The invention relates generally to hydraulically fed food cutting ("hydro-cutting") apparatuses, and more particularly to a tube assembly used in a hydro-cutting apparatus to cut food products into a plurality of smaller pieces.

Many food products, particularly vegetables and fruits, are processed prior to sale to preserve the food so it is safe and appealing at the time of consumption. The processing can be by canning or freezing, among others. Furthermore, unless it is an edible size before processing, most food products must be sliced or otherwise shaped into an edible size prior to the preservation process. Slicing and shaping operations have been accomplished traditionally with sharpened blades. Such blades can be hand-held, but hand-held knives are relatively slow and dangerous to the person using them. Other blades are machine-driven and other machines for cutting drive the food products at high speed into a stationary or machine-driven blade. Food cutting machines increase the rate and consistency of slicing, and provide a higher degree of safety in the food slicing industry.

Recent advances in food product cutting technologies have resulted in the hydraulically fed cutting apparatus. The driving force used in this system is moving water, and thus the process is called "hydraulic cutting", which is referred to by the shorthand term "hydro-cutting". Hydro-cutting involves the propulsion of water and food products, typically at very high speed, through a path that includes a stationary cutting blade. In the vegetable and fruit cutting industry, food products are sliced along the longitudinal axis (e.g., French fries) and along the transverse axis (e.g., potato chips). Production cutting systems and related knife fixtures are generally well known in the art of hydro-cutting vegetable products. Typical hydro-cutting systems have a knife fixture that is mounted at a position along the path of the food product to slice parallel to the flow of water. Such parallel cutters usually cut or slice into strips or into a helical shape. In such a system, the food products are conveyed one-at-a-time in single file succession into the stationary cutting blades with enough kinetic energy to carry the product through the stationary knife fixture.

Hydraulic food cutters are used to cut a wide variety of food products, including potatoes, beets, zucchini, cucumbers, and others. Cutting potatoes has been the most common application of hydro-cutting machines. However, it should be understood that these hydraulic food cutters are capable of cutting, and are used to cut, a wide variety of food products.

The basic configuration of a prior art system is shown, in schematic format, in FIG. 1. In such a typical prior art hydraulic cutting apparatus, where potatoes are to be cut, the potatoes are dropped into a tank 10 filled with water and then pumped through conduit into an alignment chute or tube 12 wherein the potatoes are aligned and accelerated to high speed before impinging upon a fixed array of cutter blades where the potato is cut into a plurality of smaller pieces.

The tank filled with water, which is one of the components of a prior art hydraulic cutting apparatus for use in cutting potatoes, is referred to as a receiving tank 10. Peeled or unpeeled potatoes are dropped into the receiving tank and a food pump 13, typically a single impeller centrifugal pump, is provided to drive the potatoes through the system. The pump draws water from the receiving tank and pumps the water and the suspended potatoes from the tank into the accelerating tube 12, which functions as the converging portion of a venturi. The accelerator tube is used to accelerate and align the potatoes immediately prior to impinging upon the stationary knife blades of the cutter blade assembly 14.

The use of an accelerator tube is required in order to perform two functions. First, the accelerator tube accelerates the water and food product to the velocity required in order for it to pass cleanly through the knife blade assembly. Secondly, the accelerator tube aligns and centers the food products prior to impingement upon the knife blade assembly. In the case of potatoes, a common velocity range is from about 40 to about 60 feet per second. The hydro tube is a tapered bore pipe that accomplishes this alignment. Prior art machines that use hydro tubes commonly have rigid tubes lined with flexible material.

Each whole potato impinging upon the knife blade assembly passes through the cutting blade array and is thereby cut into a plurality of food pieces, for example French fry pieces. These pieces pass with the water into the second half of the venturi which is a diverging tube 15 in which the water and the cut food pieces are decelerated back to a slower velocity. The water and cut food pieces are then deposited onto a dewatering conveyer chain 16. The water passes through the dewatering conveyor chain and is collected and recycled back to the receiving tank. The cut food pieces remain on the conveyor chain and are carried off for further processing.

During the cutting process, as the potato approaches the cutting knives, the potato needs to be aligned with the central axis of the knife set. This alignment maximizes finished product yield. In the past, significant effort has been directed toward the development of good alignment or acceleration tubes that can properly align and accelerate the whole food product so that each whole food product is properly centered relative to the cutter blade array prior to impinging upon it. An example of these efforts can be seen in U.S. Pat. No. 4,614,141, which teaches an alignment tube assembly used to accelerate and align whole potatoes immediately prior to impinging upon a cutter head array. Other patents of interest include U.S. Pat. Nos. 5,568,755 and 5,806,397, both of which, along with U.S. Pat. No. 4,614,141, are hereby incorporated by reference.

In the prior art, the alignment (accelerator) tube is usually a two-part assembly consisting of a converging, conically-shaped metal or other rigid material housing, into which is inserted a more resilient liner, which liner is usually formed of reinforced food grade rubber that seats against the inner surface of the rigid housing. In the prior art, the larger inlet end of the tapered housing is hard-plumbed to the discharge line of the centrifugal pump. Usually this is a bolted connection between a flange on the discharge line and a flange formed integrally to the input end of the tapered housing.

At the outlet end of the tapered accelerator housing, the resilient liner usually extends out a few inches and this protruding portion is inserted into the inlet hole of the cutter blade housing. In some prior art designs the outlet of the accelerator tube liner (the tip of the protruding portion) ends immediately in front of the knife blade array. A water seal between the cutter blade housing and the accelerator tube assembly can be made by hard-plumbing the accelerator tube housing to the cutter blade housing. However, this hard plumbing is not done in all designs because it is too difficult and time-consuming to remove the housing for repair and maintenance.

Since the interface region between the accelerator tube assembly and the cutter blade housing is the narrowest part of the venturi, the hydraulic pressure at that point in the system is greatly increased from that found at the discharge of the pump, usually in the range of two to ten pounds per square inch. Instead of hard plumbing the outlet of the accelerator tube assembly to the inlet of the cutter blade housing, multiple packing rings are used. This is done to reduce the time required to disassemble and remove the accelerator tube assembly from the system. Each time the outlet end of the accelerator tube liner is removed from the inlet of the cutter blade housing, the packing rings should be replaced.

Accelerator tube assemblies must be periodically disassembled for many reasons that include cleaning, replacement of worn out liners, replacement of the liner with a different size liner, and cleaning out a "plug" of uncut food product. All but the last are usually handled as scheduled maintenance items, and the time requirements, while significant, are not critical. The unscheduled and unwanted plug-up of the system is a problem because it often results in a complete shutdown of a production line without prior notice.

In the case of potatoes, production rates for hydraulic cutting systems are typically between 20,000 pounds to 35,000 pounds per hour. At a cutting rate of 20,000 pounds per hour, and assuming an average potato weight of ten ounces, the number of potatoes passing through the cutter blade assembly is approximately 32,000 potatoes per hour, or approximately 8.8 potatoes per second. If one potato plugs the cutter blade assembly, in 10 seconds there will be 88 potatoes backed up behind the cutter housing in the accelerator tube assembly; in 20 seconds, 176 potatoes. At 35,000 pounds per hour the problem is further aggravated. In practice, if a prior art hydraulic cutting apparatus plugs while unattended, it is not uncommon for the plug to include potatoes backed up into the food pump. A plug such as this can take hours to clean out since it requires substantial disassembly of the machine and its attendant piping. As a result, it is common practice in food processing plants to provide operating personnel to continuously monitor the operation of the hydro-cutting system.

The need exists for an acceleration tube that accommodates food products that vary in size without plugging.

BRIEF SUMMARY OF THE INVENTION

The invention contemplates an acceleration tube used in longitudinal cutting of food products, and further contemplates mounting a flexible hydro-cutting tube in a rigid housing, such as a housing made of stainless steel. The combination of the flexible tube and rigid housing is then installed in a conventional hydro-cutting system, such as the one shown in FIG. 1 and described above, and is used in a conventional manner, albeit with advantages and unexpected results.

The invention contemplates an accelerator tube for a hydraulic cutting system having a liquid pump and a cutting assembly through which food products are propelled. The accelerator tube comprises a substantially cylindrical, rigid housing having an outlet end and an opposite inlet end. The outlet end has an axially adjustable outlet end plate for mounting adjacent the cutting assembly, and the inlet end has an axially adjustable inlet end plate for mounting adjacent the liquid pump.

A substantially flexible, tapered tube is mounted within, and substantially coaxially to, the rigid housing. The flexible tube has an inlet flange against which the inlet end plate seats to form a seal, and an outlet flange against which the outlet end plate seats to form a seal. A centralizing ring rigidly mounts to a radially inwardly facing rigid housing sidewall near the outlet end and against which the outlet flange seats. A fluid valve is mounted through the housing sidewall to define a fluid path into an annular chamber. The chamber extends between the flexible tube and the rigid housing from the inlet flange to the outlet flange. The chamber provides space sufficient for the flexible tube to move radially during use without contacting the rigid housing sidewall.

The preferred method of inserting the flexible tube into the rigid housing includes the step of inserting an outlet end of the flexible tube into, and substantially coaxial with, the substantially cylindrical, rigid housing until an outlet flange forms a seal near a distal, outlet end of the rigid housing. Sealing an inlet flange on the flexible tube adjacent an inlet end of the rigid housing is also a step of the insertion process.

Fluid is injected through a fluid valve mounted to the housing sidewall. The fluid valve defines a fluid path into an annular chamber extending between the flexible tube and the rigid housing from the inlet flange to the outlet flange. The step of injecting fluid into the chamber thereby increases the fluid pressure in the annular chamber. The step of increasing the pressure proceeds until the outlet flange is displaced past a centralizing ring rigidly mounted to a radially inwardly facing rigid housing sidewall near the outlet end. In this manner, the annular chamber is expanded to provide space sufficient for the flexible tube to move radially during use without contacting the rigid housing sidewall. Sealing the outlet flange on the flexible tube adjacent the outlet end of the housing is another step of the insertion process, as is mounting the combined rigid housing and flexible tube to the hydraulic cutting system between a liquid pump and a cutting assembly through which food products are propelled.

Figure 1:
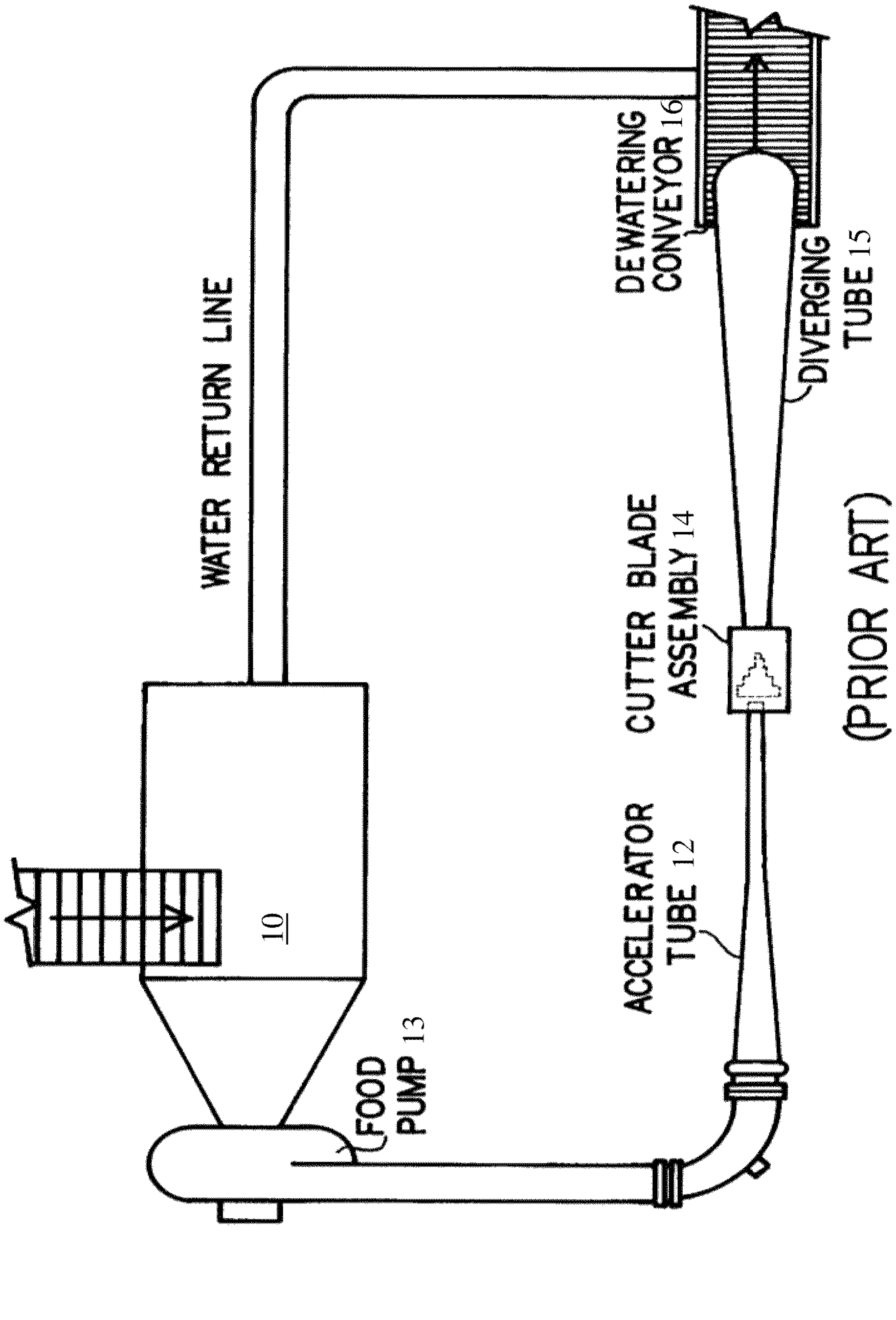
(PRIOR ART) FIG. 1
FIG. 1 is a schematic illustration of a prior art hydraulic cutting system.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

Figures 2, 6, 7:
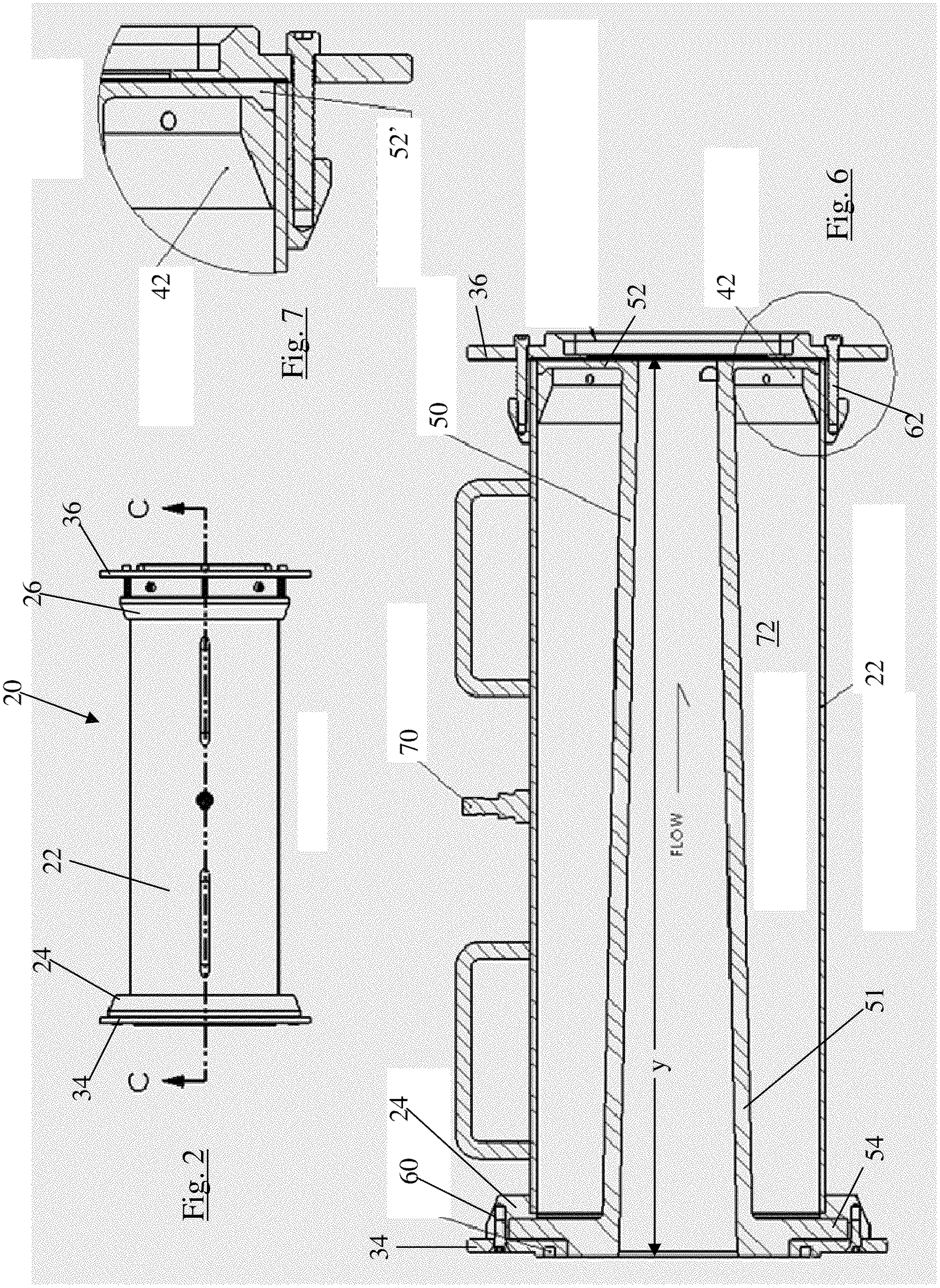
FIG. 2 is a top view illustrating a preferred embodiment of the acceleration tube.
FIG. 6 is a view in section illustrating the acceleration tube of FIG. 2 through the line C-C of FIG. 2.
FIG. 7 is a view in section illustrating the encircled portion of the lower right-hand section of the embodiment shown in FIG. 6 enlarged to show detail.

The accelerator tube 20, shown in FIG. 2 from the top and in FIG. 6 in section from the side, includes the substantially rigid and preferably cylindrical and preferably stainless steel housing 22, and the substantially flexible and preferably tapered and preferably food-grade rubber tube 50 mounted in the housing 22. The housing 22 is described herein as being "substantially rigid", which means that the housing has rigidity characteristics similar to conventional stainless steel when formed into a substantially cylindrical tube-shaped structure as shown. The term "substantially rigid" is not defined as a structure that does not deflect at all upon the application of a force, but one that deflects very little, such as an amount typical of stainless steel, when such a force is applied. Of course, the housing may be manufactured from other materials, including but not limited to cast iron, aluminum, fiber-reinforced polymer and others as will be recognized by persons of ordinary skill from the description herein.

The tube 50 is described herein as being "substantially flexible", which means that the tube has flexibility characteristics of food grade rubber when manufactured with the wall thickness, length and other parameters shown and described, and used at typical operating temperatures of hydro-cutting systems. The tube 50 is substantially flexible inasmuch as food products and water propelled through the tube 50 impact the tube 50 and cause the tube 50 to deflect radially, thereby accommodating the food products' movement through the tube 50, rather than substantially resisting such movement therethrough. Of course, the tube may be manufactured from other materials, including but not limited to urethane, natural rubber and others as will be recognized by persons of ordinary skill from the description herein.

An inlet ring 24 is rigidly mounted to the inlet end (the leftward end in the orientation shown in FIGS. 2 and 6) of the housing 22, preferably by welding or integral manufacturing, such as casting or machining, or by press-fitting or any equivalent. An outlet ring 26 is similarly rigidly mounted to the opposite, outlet end of the housing 22 (the right end in the orientation shown in FIGS. 2 and 6). An inlet end plate 34 mounts to the inlet ring 24, preferably by adjustable fasteners, such as the screws 60. An outlet end plate 36 mounts to the outlet ring 26, preferably by adjustable fasteners, such as the screws 62.

The rings 24 and 26, combined with the end plates 34 and 36, accommodate attachment to existing structures of conventional hydro-cutting systems. The end plates 34 and 36 interface with conventional hydraulic cutting system structures to which the accelerator tube 20 is mounted in an operable configuration. For example, the inlet end plate 34 is contemplated to mount to the outlet end of the water pump 13, or conduit extending therefrom. Furthermore, the outlet end plate 36 is contemplated to mount to the inlet end of a cutter blade assembly 14, or conduit extending thereto. Mounting configurations that are direct, and those that extend through other structures to a direct mount, are included within the term "adjacent to".

Figures 3, 4, 5:
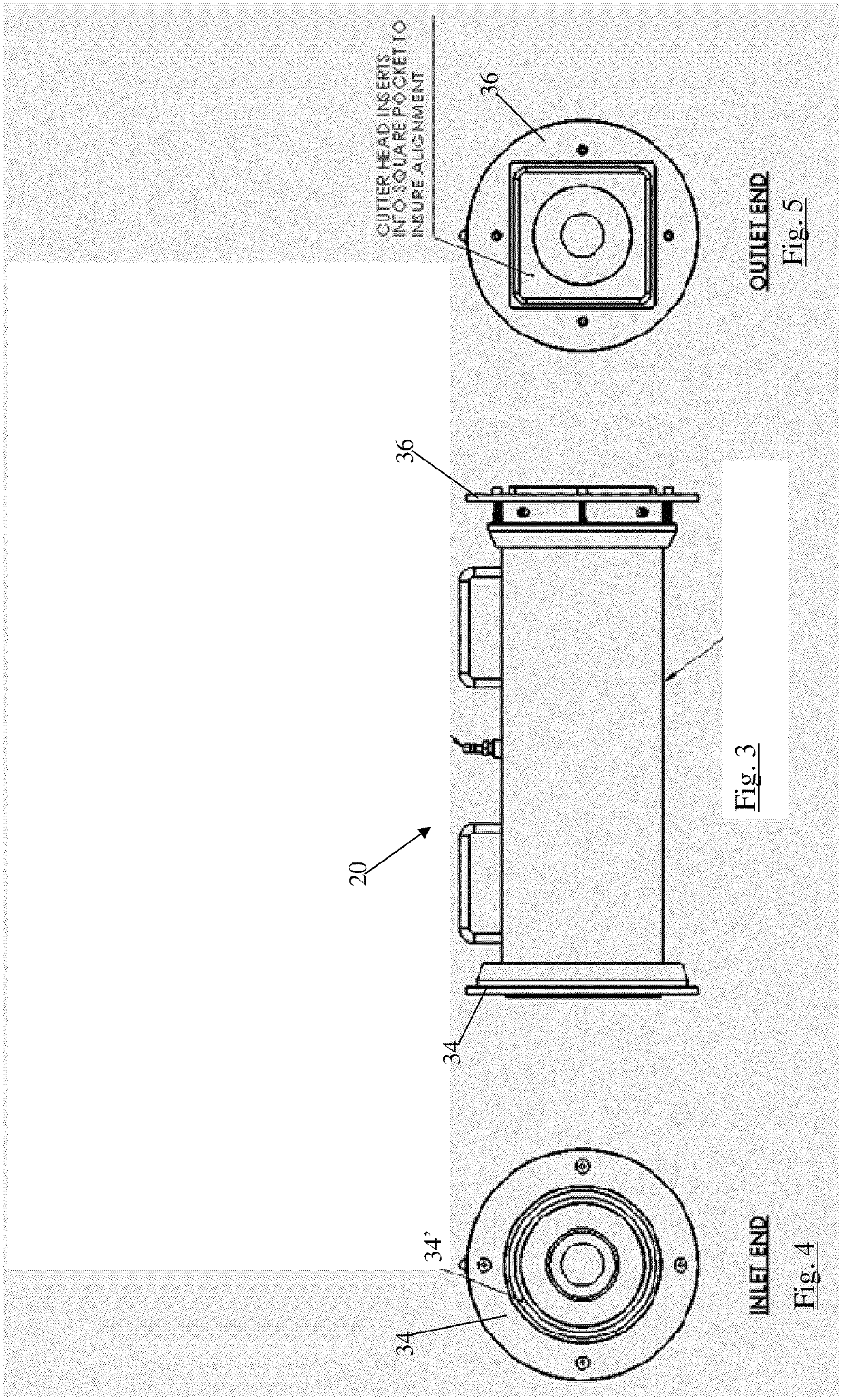
FIG. 3 is a side view illustrating the acceleration tube of FIG. 2.
FIG. 4 is an end view illustrating the inlet end of the acceleration tube of FIG. 2.
FIG. 5 is an end view illustrating the outlet end of the acceleration tube of FIG. 2.

The inlet end plate 34 mounts to the conventional conduit extending from the water pump 13 and is sealed, for example with an O-ring or a quad ring mounted in the groove 34' shown in FIG. 4. In this regard, the inlet end plate 34 is mounted adjacent the water pump 13. The flange 54 of the flexible tube 50 extends between the inlet ring 24 and the inlet end plate 34, and the inlet end plate 34 clampingly sandwiches the flange 54 using screws 60 that are threaded into the inlet ring 24, thereby sealing the flexible tube 50 to the housing 22.

The outlet end plate 36 seats adjacent, seals and aligns the accelerator tube 20 to the cutter blade assembly 14 that holds the cutter knives. There are many different styles of cutter blade assemblies, and each style typically requires a different end plate to allow the accelerator tube 20 to mount thereto, as will be apparent to the person having ordinary skill from this description. Therefore, the outlet end plate 36 can be varied from that shown to fit the cutter blade assembly present in the applicable hydro-cutting system. Nevertheless, the accelerator tube 20 has the structures described herein, despite differences in interfaces.

The flexible tube 50 is secured to the housing 22 at the outlet end in a manner that aligns the outlet end of the flexible tube 50 coaxially with the axial centerline of a cutter knife set in the cutter blade assembly 14 to which the housing 22 is attached. The outlet end plate 36 aligns the housing 22 with the cutter blade assembly 14, resulting in the radially inwardly facing surface of the housing 22 being coaxial with the axial centerline of the cutter knife set. The outlet end of the flexible tube 50 terminates in a flange 52 that has substantially the same outer diameter as the inner diameter of the rigid housing 22. Because the radially outwardly facing surface of the flange 52 is substantially equal in diameter to the radially inwardly facing surface of the housing 22, which radially inwardly facing surface is aligned with the cutter blade assembly 14 as described above, the outside of the flange 52, and thus the flexible tube 50, is aligned coaxial with the inwardly facing surface of the housing 22.

A centralizing ring 42 is attached to the radially inwardly facing surface of the housing 22, such as by screws (not shown), and maintains the flexible tube 50 in alignment with the inwardly facing surface of the housing 22 as will now be described. The centralizing ring 42 is mounted at a fixed distance from the outlet end of the housing 22 and the flange 52 is compressed between the outlet end plate 36 and the centralizing ring 42. The centralizing ring 42 thus provides an axial limit to the flange 52 while the outlet end plate 36 compresses the flexible material of the flange 52 by a small distance, such as about 0.01 inches, against the centralizing ring 42. This distance is not critical, but is representative of an amount that provides good results. Of course, this distance can vary, particularly for materials that are more or less flexible.

As shown in the magnified view of FIG. 7, the perimeter of the flange 52 has a thickened edge 52' that secures the flexible tube 50 radially. The thickened edge 52' is retained in a small pocket formed at the interface between the centralizing ring 42 and the radially inwardly facing surface of the housing 22. Therefore, the flange 52 cannot move radially from the position in which it is mounted without an amount of force being applied to it that would not normally be encountered during use. The thickened edge 52' of the flexible tube flange 52 fits tightly between the centralizing ring 42 and the outlet end plate 36. This system of securing prevents any movement of the flexible tube 50 in a radially inward direction. Thus, the flexible tube 50 is held in optimal alignment relative to the cutting knives.

From seal surface to seal surface (the distance "y" in FIG. 7), the flexible tube 50 is longer than the housing 22, preferably by a small distance, such as about 0.020 inches. This distance is not critical and can be modified according to the circumstances. The flexible tube 50 is compressed axially this small distance when the accelerator tube 20 is mounted in an operable configuration, which is shown in FIG. 6. Furthermore, the inlet end plate 34 is designed to support the axial downstream thrust generated by the flow of water and foodstuff. This inlet end plate 34 is rigid by design, and seals against liquid and gas flow therethrough.

Figure 8:
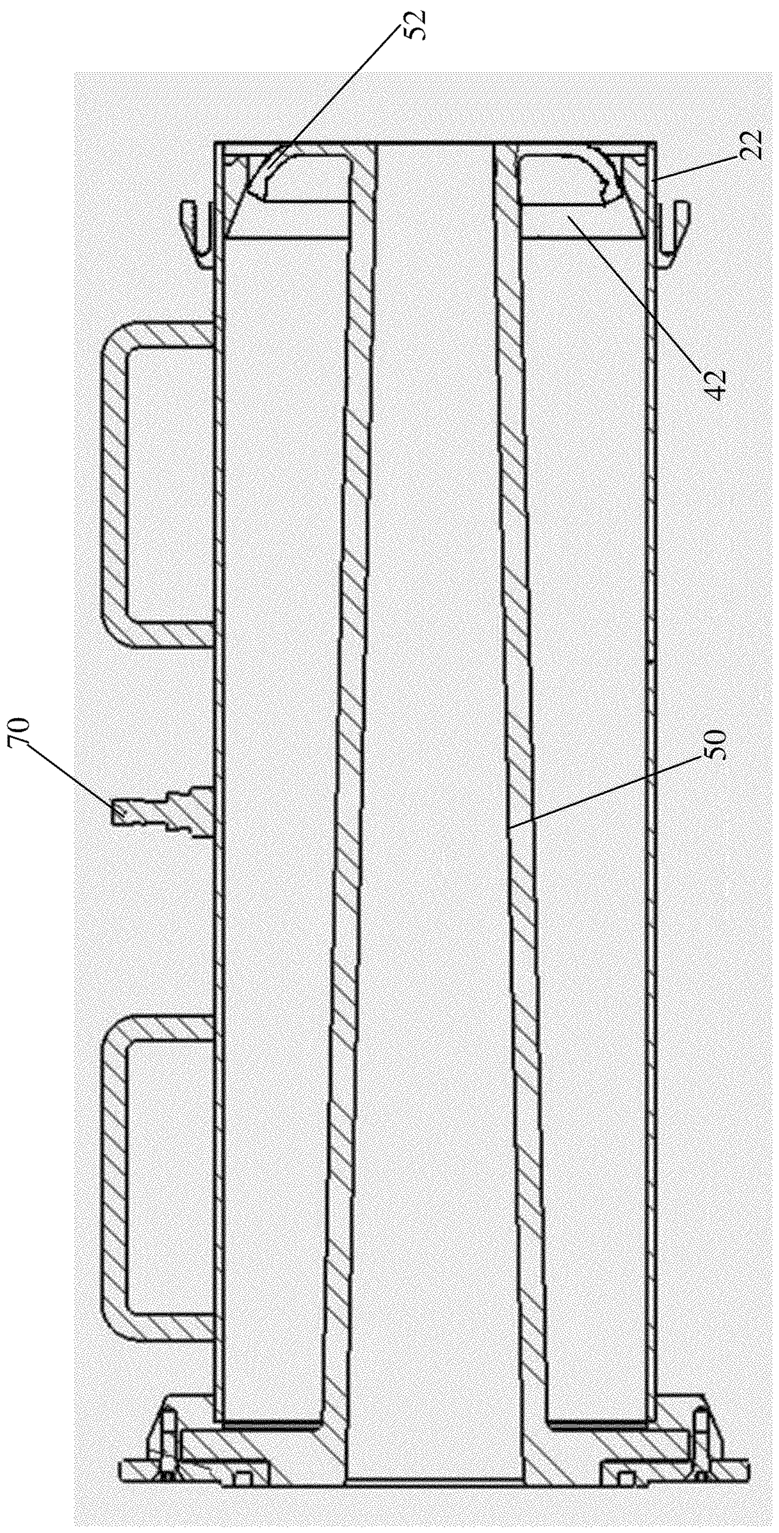
FIG. 8 is a view in section illustrating the acceleration tube in the process of assembly.

The preferred process of mounting the flexible tube 50 in the housing 22 begins by inserting the outlet end of the flexible tube 50 into the inlet end of the housing 22. This progresses until most of the tube 50 extends into the housing 22. As shown in FIG. 8, when the inserted end of the flexible tube 50 approaches the distal (outlet) end of the housing 22, the outlet flange 52 cannot extend beyond the centralizing ring 42 due to the size of the outlet flange 52 relative to the diameter of the inwardly facing surface of the centralizing ring 42. Instead, when the flexible tube 50 is inserted from the left side (in the orientation of FIG. 8) and the outlet end is pushed toward the outlet end, the flange 52 does not pass the centralizing ring 42 entirely. Instead, the elastomeric or otherwise flexible material of which the flexible tube 50 is made causes the flange 52 to flex toward the inlet end rather than pass entirely through the centralizing ring 42.

When the flange 52 is in the configuration shown in FIG. 8, in order to position the flange 52 on the opposite side of the centralizing ring 42 in its seat at the distal end of the housing 22 (as shown in FIG. 6), a force sufficient to cause the flange 52 to pass the centralizing ring 42 must be applied to the flange 52. In the preferred embodiment, it is preferred to apply this force after the flange 54 is clamped tightly between the end plate 34 and the inlet ring 24. However, after compressing the inlet end plate 34 using the mounting screws 60, the inside of the rigid housing 22 seals against the flexible tube 50 at the inlet end (at flange 54) and it is difficult, if not impossible, to apply such a force by extending a tool past the flange 54 at the inlet end, or past the flange 52 from the outlet end. Nevertheless, clamping the flange provides a seal at the inlet end of the housing 22 that permits a unique application of force to the flange 52 using fluid pressure, because after the flange 54 is clamped to the housing 22, a seal is formed between the inlet end of the housing and the tube.

There is also a seal at the outlet end where the flange 52 flexes toward the inlet end and seats against the radially inwardly facing sidewall of the housing 22 and/or the centralizing ring 42, depending on the dimensions of the flange 52. A substantially fluid-tight, annular chamber 72 is thereby formed, radially between the flexible tube 50 and the radially inwardly facing surface of the housing 22, and axially between the flanges 52 and 54. This annular chamber 72 is substantially sealed against fluid moving outward due to the final seal at the inlet end and the moveable seal at the outlet end. Compressed fluid can be forced into this chamber 72 in order to apply the necessary longitudinal force against the flange 52.

A one-way fluid valve, such as the Schrader valve 70, is mounted in the housing 22 to create a path into the chamber 72. Using this valve 70 one can inject fluid, such as compressed air, through the housing 22 sidewall into the chamber 72. As the chamber 72 air pressure rises above the pressure outside the housing 22, the increase in pressure begins to apply a longitudinal force against the flange 52. As the force increases, the extreme radial edges of the flange 52 gradually move past the centralizing ring 42 (remaining sealed against the sidewall), and then "pop" out and into the seat near where the outlet end plate 36 is installed against it as shown in FIG. 6. The end plate 36 is then installed.

The substantially annular space 72 between the body shell 22 and the fully installed and sealed flexible tube 50 is important. This space 72, coupled with the elastic properties of the flexible tube 50, causes the acceleration tube 20 to outperform conventional acceleration tubes. Optimal alignment of foodstuff propelled through the tube 50 is accomplished, even when the foodstuff is in intimate contact with the interior surface of the hydro tube. This is because the elastomeric properties of the flexible tube 50 promote alignment of food products while nearly eliminating damage to the surface of the foodstuff that contacts the flexible tube. Because the tube 50 is flexible, and because the annular chamber 72 preferably contains a fluid that can be compressed, as a food product larger in diameter than the tube 50 impacts the tube sidewall, the sidewall expands radially and allows the food product to pass through. Thus, it is important that the sidewall of the tube 50 remain sufficiently flexible during use that any food products that are smaller in diameter than the smallest region of the housing 22, but larger than the smallest diameter of the tube 50, can pass readily through the tube 50 to the cutting assembly 14 without substantial damage to either the food product or the tube 50. This is accomplished in the invention using the flexible tube 50 within the rigid housing 22 and an annular fluid space therebetween.

Figure 9:
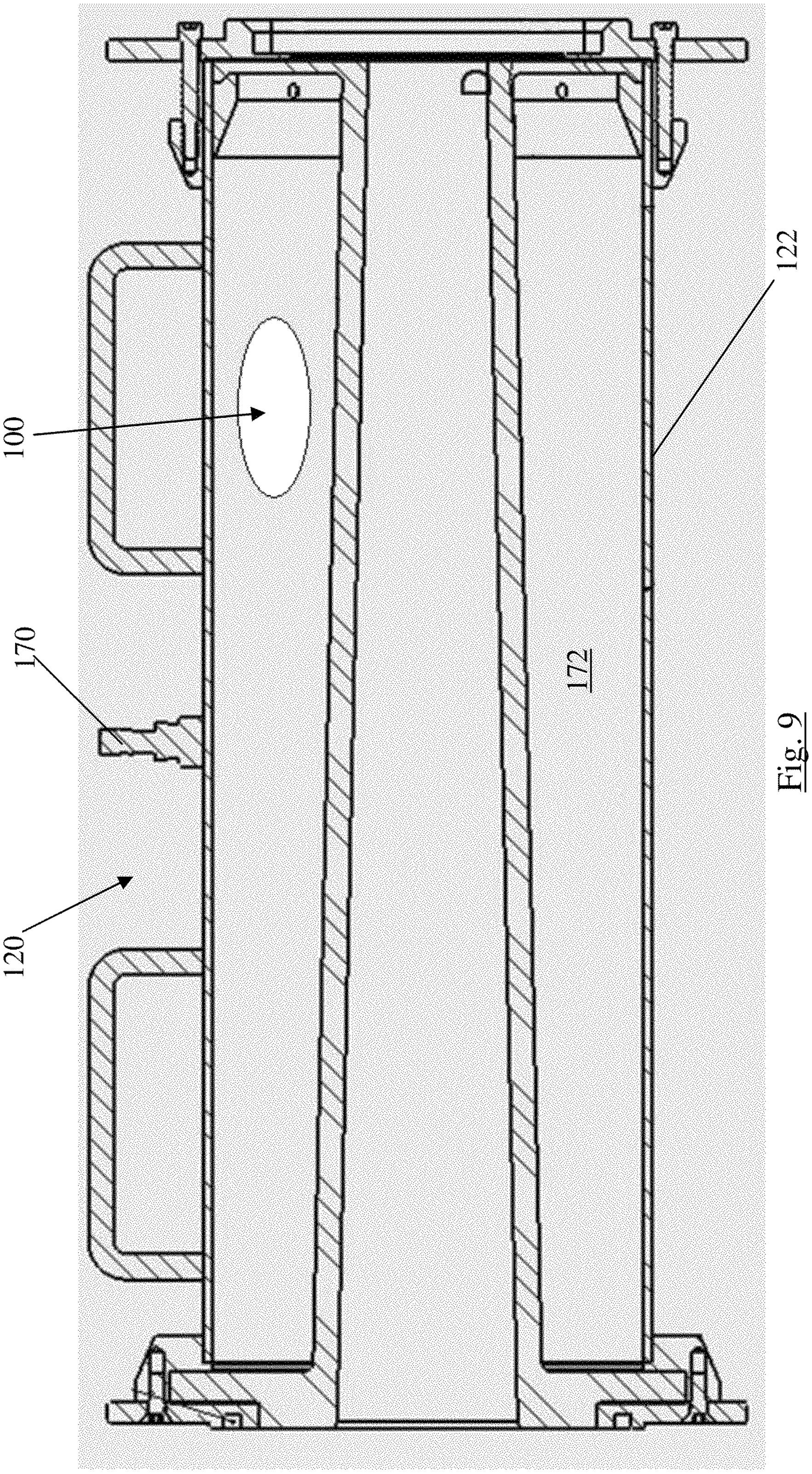
FIG. 9 is a view in section illustrating an alternative embodiment of the present invention.

It will become apparent that the invention retains some advantages of the preferred embodiment, even without maintaining pressurized fluid, such as air, in the annular chamber 72. That is, the chamber 72 can be filled with air that is at a pressure higher than atmospheric pressure. Alternatively, the pressure can be lower than, or the same as, atmospheric pressure. Still further, it is contemplated that the housing can have openings therein to relieve any difference in pressure between the atmosphere and the chamber. It is also contemplated that openings can be formed in the housing in order to reduce the weight and/or cost of the housing, as is shown in FIG. 9 in which the accelerator tube 120 has an opening 100 in the housing 122. The opening 100 allows fluid to pass freely between the chamber 172 and the atmosphere, and reduces the weight and cost of the tube 120. Multiple such openings can be formed in the housing 122, as desired.

It should also be noted that the housing 22 shown in FIGS. 2-8 can include a centralizing ring (not shown) mounted to the inlet end in a manner similar to the centralizing ring 42. This alternative can be used to provide additional support to the flange 54, or for other reasons. Such an inlet end centralizing ring would be somewhat readily bypassed by the flange 52 during insertion, unlike the centralizing ring 42, because an inlet end centralizing ring is within reach of the person inserting the flexible tube 50 into the housing 22.

It will also become apparent from the description herein that the housing 22 permits different sizes of flexible tubes to be mounted therein instead of the flexible tube 50 shown in the drawings. The removable end plates allow the design to house different bore sizes of flexible tubes, different taper shapes and taper angles. Thus the acceleration tube 20 attempts to be a "one size fits all" device, because the only component that must be changed to process a different product is a flexible tube that fits the new product. This reduces the number of acceleration tube units that are required to service a product line.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An accelerator tube for a hydraulic cutting system having a liquid pump and a cutting assembly through which food products are propelled, the accelerator tube comprising:

(a) a substantially cylindrical, rigid housing having an outlet end with an axially adjustable outlet end plate for mounting adjacent the cutting assembly, and an opposite inlet end with an axially adjustable inlet end plate for mounting adjacent the liquid pump;

(b) a substantially flexible, tapered tube mounted within, and substantially coaxially to, the rigid housing, the flexible tube having an inlet flange against which the inlet end plate seats, and an outlet flange against which the outlet end plate seats;

(c) a centralizing ring rigidly mounted to a radially inwardly facing rigid housing sidewall near the outlet end and against which the outlet flange seats; and (d) a fluid valve mounted through the housing sidewall to define a fluid path into an annular chamber extending between the flexible tube and the rigid housing from the inlet flange to the outlet flange, wherein the annular chamber provides space sufficient for the flexible tube to move radially during use without contacting the rigid housing sidewall.

2. The accelerator tube in accordance with claim 1, wherein the annular space is a fluid-tight chamber, the outlet end plate seats against the outlet flange to form a seal, the inlet end plate seats against the inlet flange to form a seal, and fluid pressure in the annular chamber is greater than atmospheric pressure.

3. The accelerator tube in accordance with claim 1, wherein the fluid valve is an opening that permits the substantially free flow of gas between the atmosphere and the annular chamber.

* * * * *